US008929644B2

(12) United States Patent
Zhang et al.

(10) Patent No.: US 8,929,644 B2
(45) Date of Patent: Jan. 6, 2015

(54) 3D SHAPE MEASUREMENT USING DITHERING

(71) Applicants: Song Zhang, Ames, IA (US); Yajun Wang, Ames, IA (US); William F. Lohry, Ames, IA (US)

(72) Inventors: Song Zhang, Ames, IA (US); Yajun Wang, Ames, IA (US); William F. Lohry, Ames, IA (US)

(73) Assignee: Iowa State University Research Foundation, Ames, IA (US)

( * ) Notice: Subject to any disclaimer, the term of this patent is extended or adjusted under 35 U.S.C. 154(b) by 207 days.

(21) Appl. No.: 13/732,548

(22) Filed: Jan. 2, 2013

(65) Prior Publication Data

US 2014/0064603 A1 Mar. 6, 2014

(51) Int. Cl.
*G06K 9/00* (2006.01)
*G01B 11/25* (2006.01)

(52) U.S. Cl.
CPC .................................. *G01B 11/2513* (2013.01)
USPC ........................................................ 382/154

(58) Field of Classification Search
CPC ............... G01B 11/25; G01B 11/2527; G06T 2207/04; G06K 2209/40; G06K 9/00214
USPC ......................................................... 382/154
See application file for complete search history.

(56) References Cited

U.S. PATENT DOCUMENTS

| | | | |
|---|---|---|---|
| 6,788,210 B1 * | 9/2004 | Huang et al. .................. 340/612 |
| 7,545,516 B2 | 6/2009 | Jia et al. |
| 7,676,114 B2 | 3/2010 | Chung et al. |
| 7,929,751 B2 * | 4/2011 | Zhang et al. .................. 382/154 |
| 8,014,002 B2 * | 9/2011 | Keshavmurthy et al. ..... 356/610 |
| 8,064,685 B2 | 11/2011 | Solem et al. |
| 8,077,944 B2 | 12/2011 | Schummers |
| 8,581,979 B2 * | 11/2013 | Chou et al. ..................... 348/135 |
| 8,754,954 B2 * | 6/2014 | Drouin et al. .............. 348/222.1 |
| 2007/0115484 A1 * | 5/2007 | Huang et al. .................. 356/604 |
| 2008/0212838 A1 | 9/2008 | Frigerio |
| 2009/0238449 A1 | 9/2009 | Zhang et al. |
| 2011/0080471 A1 * | 4/2011 | Song et al. ...................... 348/46 |
| 2011/0313721 A1 * | 12/2011 | Keshavmurthy et al. ..... 702/156 |
| 2012/0307260 A1 * | 12/2012 | Keshavmurthy et al. ..... 356/610 |

FOREIGN PATENT DOCUMENTS

WO WO 2007/061632 A2 5/2007

OTHER PUBLICATIONS

S.G Narasimhan, S. J. Koppal and S. Yamazaki, "Temporal Dithering of Illumination for Fast Active Vision", European Conference on Computer Vision (ECCV), Oct. 2008.*
Chen, X. et al., "Phase Error Compensation Method using Smoothing Spline Approximation for a Three-Dimensional Shape Measurement System Based on Gray-Code and Phase-Shift Light Projection", Opt. Eng. 47 113601, (2008).
Cheng, Y. et al., "Two-wavelength phase shifting interferometry", Appl. Opt. 23, 4539-4543, (1984).

(Continued)

*Primary Examiner* — Utpal Shah
(74) *Attorney, Agent, or Firm* — McKee, Voorhees & Sease

(57) ABSTRACT

A method for three-dimensional (3D) shape measurement includes generating fringe patterns using a dithering technique, projecting the fringe patterns onto an object using a projector, capturing the fringe patterns distorted by surface geometry of the object using an imaging device, and performing a fringe analysis to reconstruct a 3D shape of the object using the fringe patterns and the fringe patterns distorted by the surface geometry of the object. The step of generating the fringe patterns using the dithering technique may include binarizing sinuisoidal fringe patterns with the dithering technique. The step of generating the fringe patterns using the dithering technique may include applying an optimization algorithm.

16 Claims, 16 Drawing Sheets

(56) References Cited

OTHER PUBLICATIONS

Cheng, Y. et al., "Multiple-wavelength phase shifting interferometry", Appl. Opt. 24, 804-807, (1985).

Creath, K., "Step height measurement using two-wavelength phase-shifting interferometry", Appl. Opt. 26, 2810-2816, (1987a).

Decker, J. E. et al., "Increasing the range of unambiguity in step-height measurement with multiple-wavelength interferometry-application to absolute long gauge block measurement", Appl. Opt. 42, 5670-5678, (2003).

Dhond, U. et al., "Structure from stereo—a review", IEEE Trans. Systems, Man, and Cybernetics 19(6),1489-1510, (1989).

Geng, Z. J., "Rainbow 3-d camera: New concept of high-speed three vision system", Opt. Eng. 35, 376-383, (1996).

Harding, K. G., Phase grating use for slop discrimination in moire contouring, in "Proc. SPIE", vol. 1614 of Optics, illumination, and image sensing for machine vision VI, pp. 265-270.—TA1632 O685A, (1991).

Huang, P. S. et al., "Color-encoded digital fringe projection technique for high-speed three-dimensional surface contouring", Opt. Eng. 38, 1065-1071, (1999).

Huang, P. S. et al., "Fast three-step phase shifting algorithm", Appl. Opt. 45, 5086-5091, (2006).

Jones, A., McDowall et al., Rendering forah interactive 360± light eld display, in "ACM SIGGRAPH", p. 40, (2007).

Mehta, D. S. et al., "Two-wavelength talbot effect and its application for three-dimensional step-height measurement", Appl. Opt. 45, 7602-7609, (2006).

Polhemus, C., "Two-wavelength interferometry", Appl. Opt. 12,2071-2074, (1973).

Roy, M. et al.,"White-light interference microscopy: a way to obtain high lateral resolution over an extended range of heights", Opt. Express 14, 6788-6793, (2006).

Salvi, J. et al., "Pattern cod i-cation strategies in structured light systems", Pattern Recognition 37(4),827-849, (2004).

Warnasooriya, N. et al., "Led-based multi-wavelength phase imaging interference microscopy", Opt. Express 15, 9239-9247, (2007).

Zhang, S. et al., "Gpu-assisted high-resolution, real-time 3d shape measurement", Opt. Express 14, 9120-9129, (2006).

Zhang, S. et al., "High-resolution, real-time 3d absolute coordinate measurement based on a phase-shifting method", Opt. Express 14, 2644-2649, (2006).

Zhang, L. et al., Rapid shape acquisition using color structured light and multi-pass dynamic programming, in "The 1st IEEE International Symposium on 3D Data Processing, visualization iand Transmission",. pp. 24-36, (2002).

Zhang, S. et al., "High-resolution, real-time three-dimensioal shape measurement", Opt. Eng. 45, 123601, (2006a).

Zhang, S. et al., "Multilevel quality-guided phase unwrapping algorithm for real-time three-dimensional shape reconstruction", Appl. Opt. 46, 50-57, (2007).

Zhang, S. et al., "Projection Defocus Analysis for Scene Capture and Image Display", Jul. 2006.

\* cited by examiner

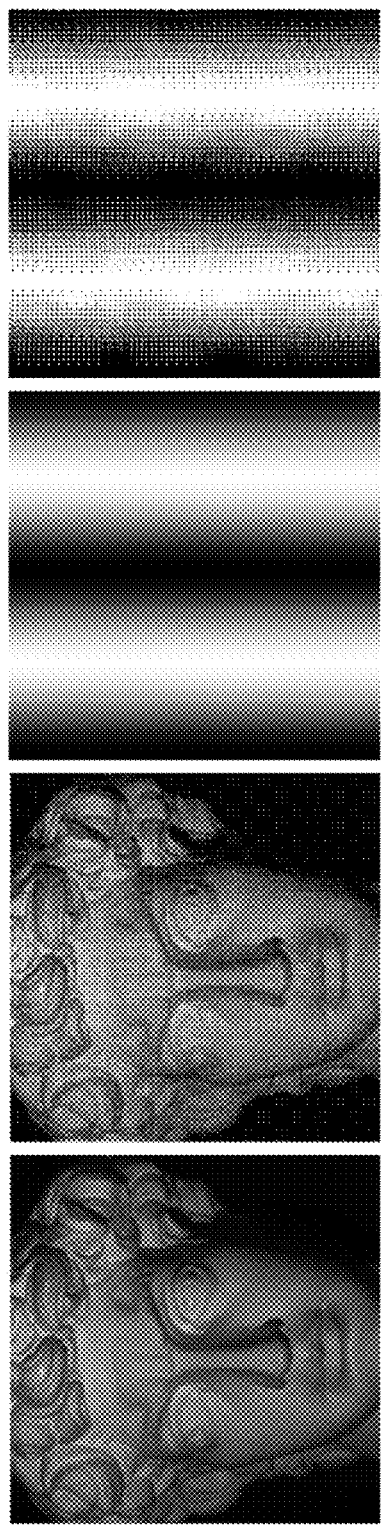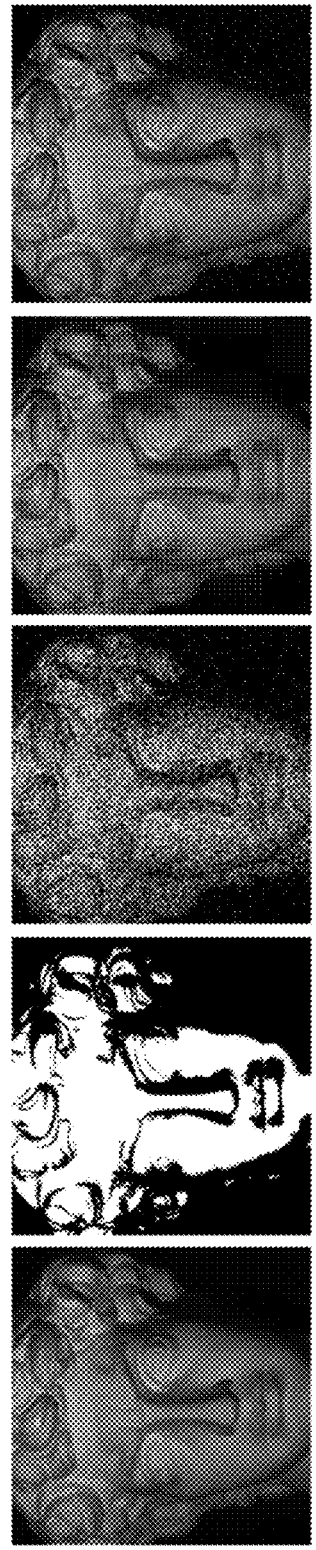

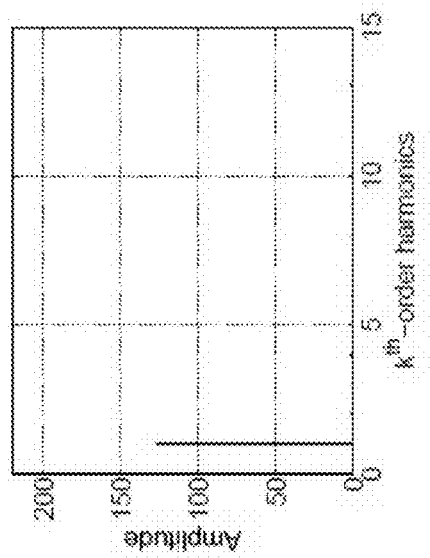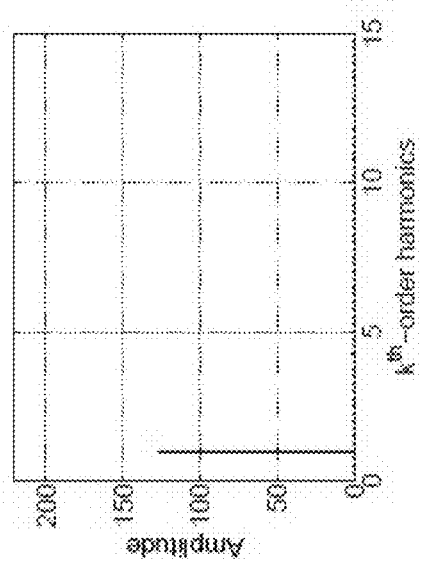
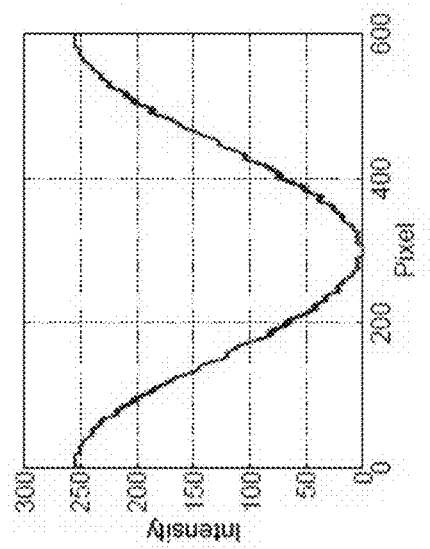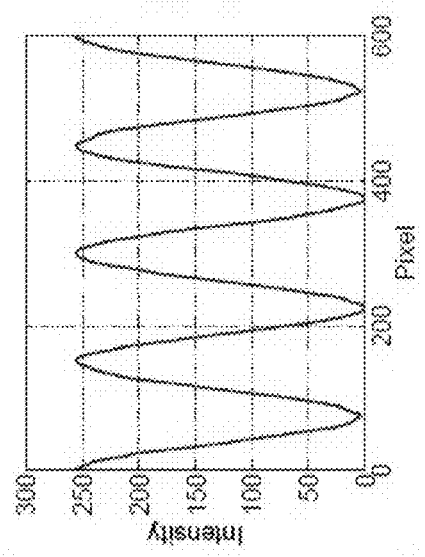
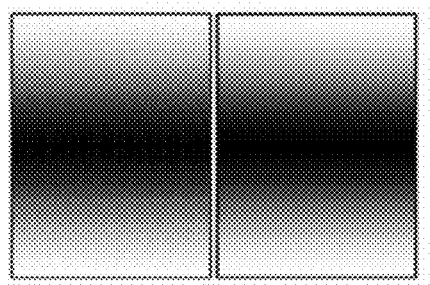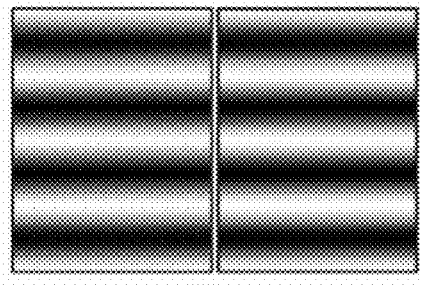
FIG. 3A  FIG. 3B  FIG. 3C
FIG. 3D  FIG. 3E  FIG. 3F

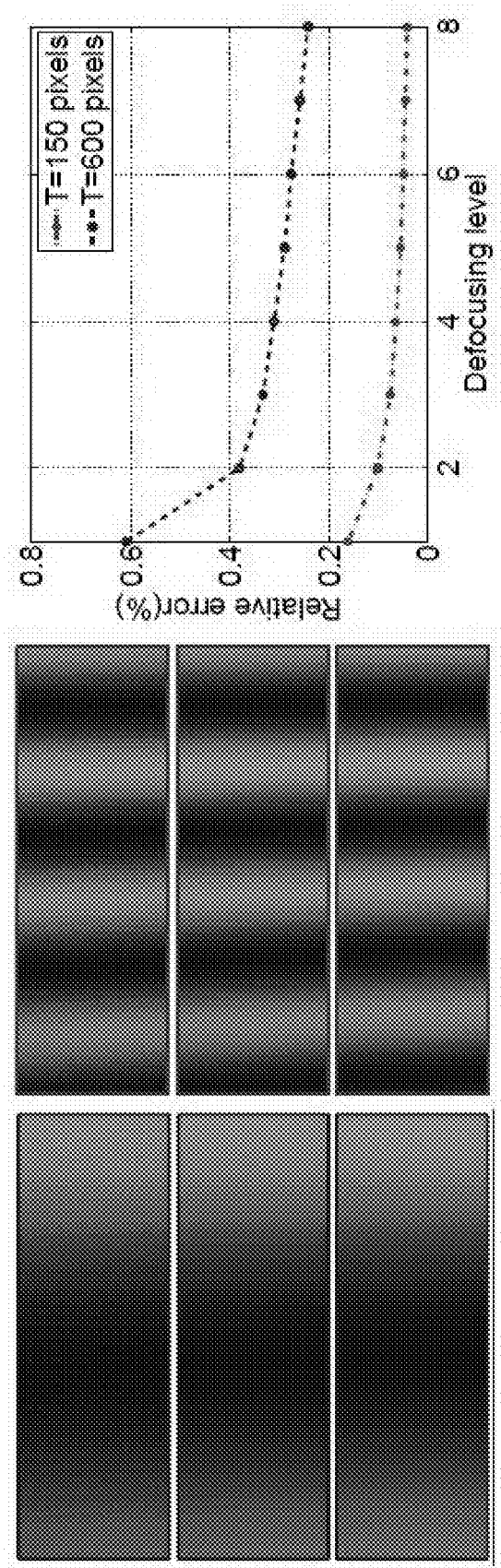

T = 600    T = 150    T = 60

T = 600    T = 150    T = 60

T = 600    T = 150    T = 60

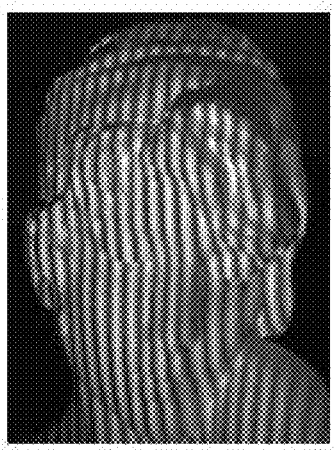  
FIG. 10A  FIG. 10B  FIG. 10C
  
FIG. 10D  FIG. 10E  FIG. 10F

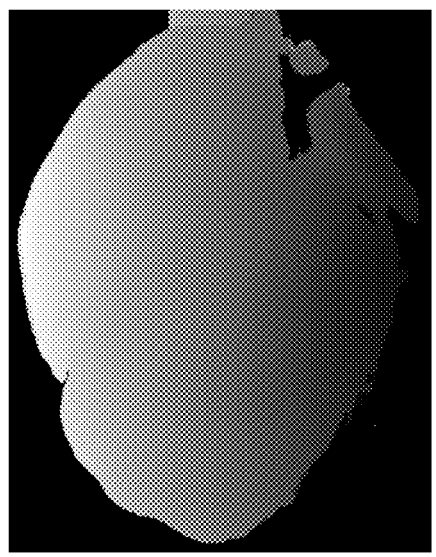
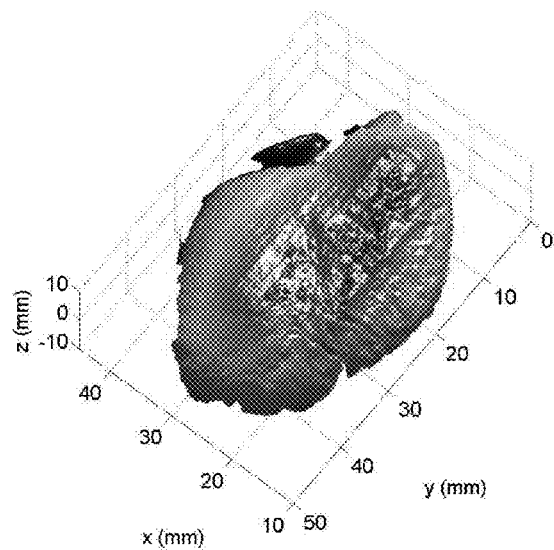
*FIG. 15A*  *FIG. 15B*

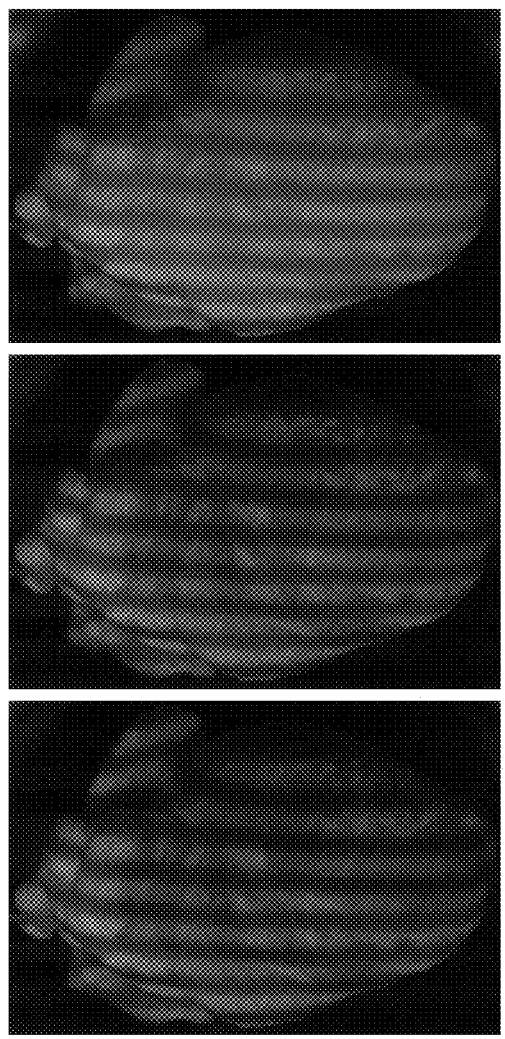
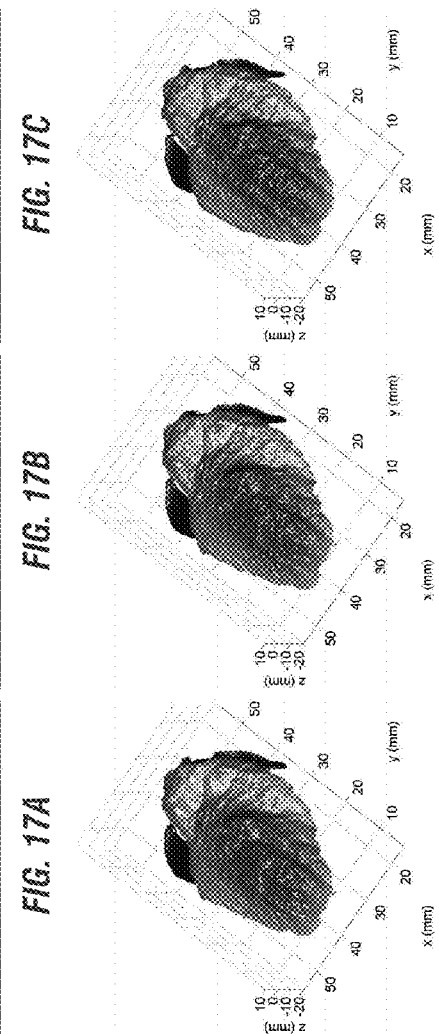
FIG. 17A  FIG. 17B  FIG. 17C
FIG. 17D  FIG. 17E  FIG. 17F

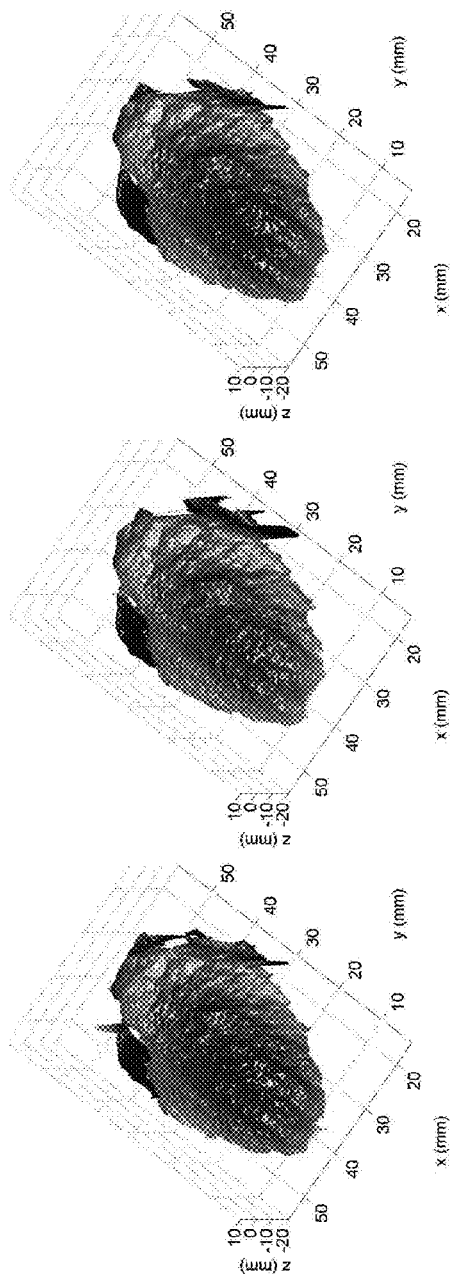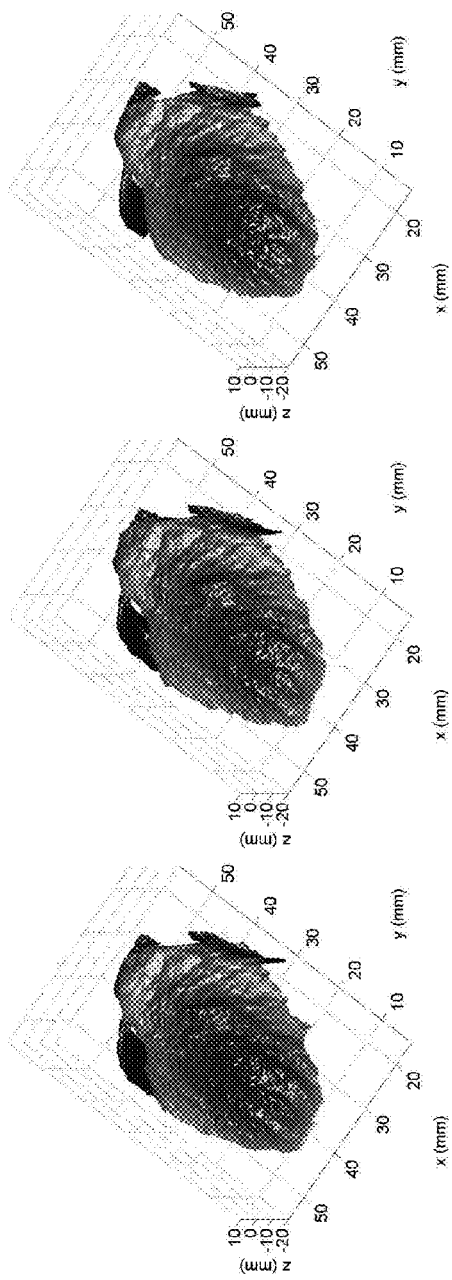
FIG. 18A  FIG. 18B  FIG. 18C
FIG. 18D  FIG. 18E  FIG. 18F

3D SHAPE MEASUREMENT USING DITHERING

GRANT REFERENCE

This invention was made with government support under NSF Grant CMMI1150711 awarded by National Science Foundation. The government has certain rights in the invention.

FIELD OF THE INVENTION

The present invention relates to three-dimensional (3D) shape measurement. More particularly, but not exclusively, the present invention relates to using dithering in 3D shape measurement.

BACKGROUND OF THE INVENTION

Binary defocusing techniques have been used in three-dimensional (3D) shape measurement. Such techniques typically use some form of sinusoidal fringe projection. Yet despite the various benefits provided, problems remain.

SUMMARY OF THE INVENTION

Therefore, it is a primary object, feature, or advantage of the present invention to improve over the state of the art.

It is a further object, feature, or advantage of the present invention to provide for 3D shape measurement.

It is a still further object, feature, or advantage of the present invention to address issues with 3D shape measurement when fringe stripes are narrow or wide.

It is another object, feature, or advantage of the present invention to address issues with 3D shape measurement when the projector is nearly focused, or is even focused.

It is yet another object, feature, or advantage of the present invention to provide three-dimensional (3D) shape measurement which is high quality.

It is a further object, feature, or advantage of the present invention to provide three-dimensional (3D) shape measurement which may be performed at high speeds.

One or more of these and/or other objects, features, or advantages of the present invention will become apparent from the description and claims that follow. No single embodiment need have all of these objects, features, or advantages and different embodiments may have different objects, features, or advantages. The present invention is not to be limited by or to these objects, features, or advantages.

According to one aspect, a method for three-dimensional (3D) shape measurement is provided. The method includes generating fringe patterns using a dithering technique, projecting the fringe patterns onto an object using a projector, capturing the fringe patterns distorted by surface geometry of the object using an imaging device, and performing a fringe analysis to reconstruct a 3D shape of the object using the fringe patterns and the fringe patterns distorted by the surface geometry of the object. The step of generating the fringe patterns using the dithering technique may include binarizing sinuisoidal fringe patterns with the dithering technique. The step of generating the fringe patterns using the dithering technique may include applying an optimization algorithm, such as a genetic algorithm. The fringe patterns may approximate sinusoidal structures. The method may further include defocusing the projector before projecting the fringe patterns. The method may further include nearly focusing or even focusing the projector before projecting the fringe patterns.

The method may further include generating an additional set of fringe patterns using a pulse width modulation technique, projecting the additional set of fringe patterns onto the object using the projector, and capturing the additional set of the fringe patterns distorted by the surface geometry of the object using the imaging device and the fringe analysis may further use the additional set of the fringe patterns and the additional set of the fringe patterns as distorted by the surface geometry of the object.

According to another aspect, a method for three-dimensional (3D) shape measurement includes generating a first set of fringe patterns using a dithering technique, generating a second set of fringe patterns using a pulse width modulation technique, projecting the fringe patterns from the first set of the fringe patterns and the second set of the fringe patterns onto an object using a projector, capturing the fringe patterns distorted by surface geometry of the object using an imaging device, and performing a fringe analysis to reconstruct a 3D shape of the object using the fringe patterns and the fringe patterns distorted by the surface geometry of the object using a computing device.

BRIEF DESCRIPTION OF THE FIGURES

FIGS. 1A to 1D illustrate a binary dithering technique for 8-bit grayscale images. FIG. 1A illustrates an original 8-bit image of David head; FIG. 1B illustrates a binary dithered image of the image of FIG. 1A; FIG. 1C illustrates an original 8-bit sinusoidal structured pattern; FIG. 1D illustrates a binary dithered pattern of the image of FIG. 1C.

FIGS. 2A to 2E illustrate binary dithering techniques for a 8-bit grayscale image. FIG. 2A illustrates an original 8-bit image of the David head. FIG. 2B illustrates a binary dithered image of FIG. 2A by applying the thresholding technique. FIG. 2C illustrates a binary dithered image of FIG. 2A by applying a random dithering technique. FIG. 2D illustrates a binary dithered image of FIG. 2A by applying the Bayer ordered dithering technique. FIG. 2E illustrates a binary dithered image of FIG. 2A by applying the error-diffusion dithering technique.

FIGS. 3A to 3F illustrate simulation results of the proposed technique of one aspect of the present invention. FIG. 3A illustrates a binary dithered pattern and its smoothed pattern (T=600), top image shows the dithered pattern and the bottom image shows the smoothed pattern. FIG. 3B illustrates a cross section of the blurred pattern. FIG. 3C illustrates a Fourier spectrum of the cross section shown in FIG. 3B. FIGS. 3D-3F illustrate corresponding results to above image when T=150.

FIG. 4A illustrates fringe patterns (T=600). FIG. 4B illustrates fringe patterns (T=150). FIG. 4C illustrates phase error percentage. FIG. 4A and FIG. 4B from top to bottom show defocusing levels of 1, 4, 8, respectively.

FIGS. 5A to 5C illustrate phase errors with varying amount of defocusing by experiments. FIG. 5A illustrates fringe patterns (T=600). FIG. 5B illustrates fringe patterns (T=150). FIG. 5C illustrates phase error percentage. FIGS. 5A and 5B from top to bottom show defocusing levels of 1, 4, 8, respectively.

FIG. 6A to 6C illustrate representative captured dithered patterns. FIG. 6D to 6F illustrate 3D results using the dithered patterns. FIG. 6G to 6I illustrate 3D results using ideal sinusoidal patterns.

FIG. 7A illustrates an ideal pattern; FIG. 7B illustrates parent 1. FIG. 7C illustrates parent 2. FIG. 7D illustrates crossover from FIG. 7B to FIG. 7C.

FIG. 8A illustrates an ideal sinusoidal. FIG. 8B illustrates Bayer dithering. FIG. 8C illustrates error-diffusion dithering. FIG. 8D illustrates genetic optimized. FIG. 8E illustrates cross sections. FIG. 8F illustrates cross sections of intensity difference maps.

FIGS. 9A and 9B illustrate simulation results. FIGS. 9C and 9D illustrate experimental results.

FIGS. 10A to 10F illustrate measurement results of 3D statue using different dithering techniques. FIGS. 10A to 10C respectively shows one of the fringe patterns using the Bayer, error-diffusion, genetic optimized dithering techniques. FIGS. 10D to 10F illustrate 3D results using above fringe patterns.

FIG. 12A illustrates a Bayer-dithering pattern. FIG. 12B illustrates a cross section of FIG. 12A after Gaussian smoothing. FIG. 12C illustrates phase error (rms error of 0.012 rad). FIG. 12D illustrates error-diffusion dithered pattern. FIG. 12E illustrates a cross section of FIG. 12C after Gaussian smoothing. FIG. 12F illustrates phase error (rms 0.008 rad).

FIG. 14A to FIG. 14C illustrate high-frequency fringe patterns. FIG. 14D illustrates a wrapped phase map of high frequency patterns. FIG. 14E to FIG. 14G illustrate low-frequency fringe patterns. FIG. 14H illustrate a wrapped phase map of low frequency pattern.

FIGS. 15A to 15B illustrate an unwrapped phase map for dead heart measurement. FIG. 15A illustrates an unwrapped phase map. FIG. 15B illustrates a 3D reconstructed shape of the heart surface.

FIG. 16A illustrates one fringe pattern using blue light. FIG. 16B illustrates one fringe pattern using green light. FIG. 16C illustrates one fringe pattern using red light. FIG. 16D illustrates a 3D result using blue light. FIG. 16E illustrates a 3D result using green light. FIG. 16F illustrates a 3D result using red light.

FIGS. 17A to 17F illustrate a comparison of different spectrum for beating heart measurements. FIG. 17A illustrates one fringe pattern using blue light. FIG. 17B illustrates one fringe pattern using green light. FIG. 17C illustrates one fringe pattern using red light. FIG. 17D illustrates a 3D result using blue light. FIG. 17E illustrates a 3D result using green light. FIG. 17F illustrates a 3D result using red light.

FIGS. 18A to 18F illustrates a comparison of different speed for beating heart measurements. FIGS. 18A to 18F respectively shows the 3D results with 200, 300, 400, 500, 800 and 1000 Hz.

DETAILED DESCRIPTION

Figures 4A, 4B, 4C:
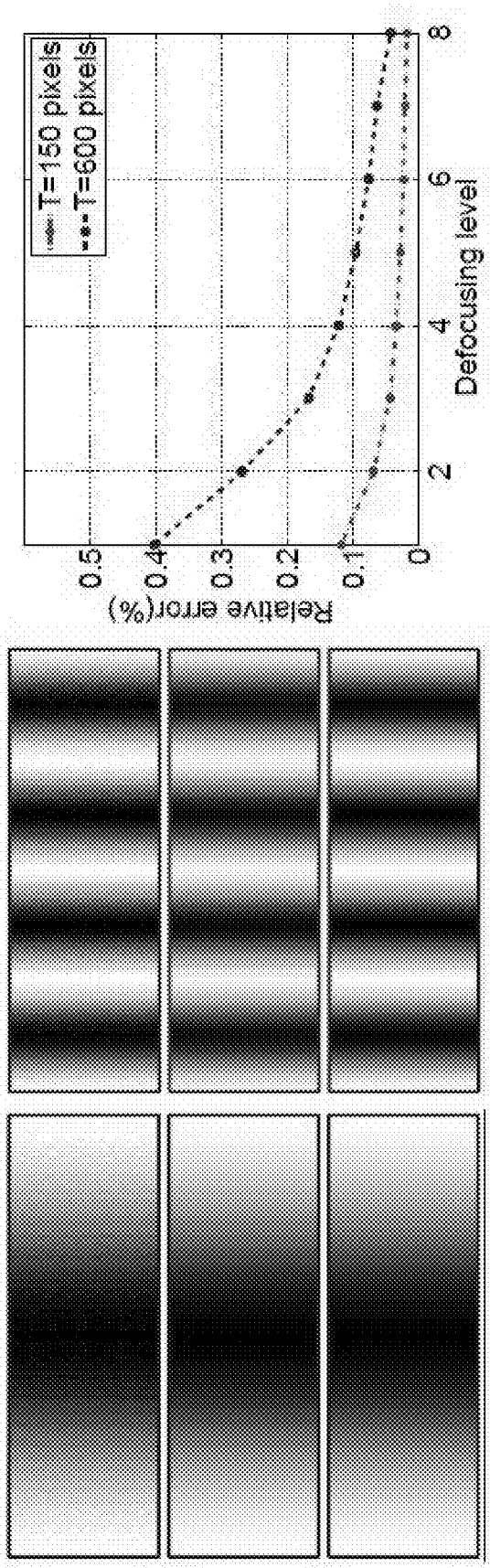
FIGS. 4A to 4C illustrate phase errors with varying amount of defocusing by simulations.

The detailed description is divided into four main sections. Section A is directed towards 3D shape measurement with binary dithered patterns. Section B is directed towards a genetic method to optimize dithering. Section C is directed towards 3D absolute shape measurement using a superfast two-frequency absolute phase-shifting technique. Section D is directed towards various options, variations, and alternatives.

A. 3D Shape Measurement with Binary Dithered Patterns

1. Introduction

The recently proposed binary defocusing technique [1] and its variations [2, 3] have demonstrated their superiorities over conventional sinusoidal fringe projection techniques for three-dimensional (3D) shape measurement. Yet, it is very difficult for them to produce high-quality 3D shape measurement when the fringe stripes are wide and when the projector is nearly focused [4]. This is because for the binary defocusing techniques, binary patterns are fed to the projector and sinusoidal patterns are generated by properly defocusing the projector. However, due to the hardware limitation (projector lens can only be changed to a certain level), when the fringe stripes are wide, it is very difficult to generate high-quality sinusoidal patterns from these binary patterns through defocusing.

The aforementioned improved binary defocusing techniques [2, 3] are, after all, modifying the patterns in one dimension; yet the desired sinusoidal fringe patterns are two dimensional in nature. This indicates that if the binary patterns are modified in both dimensions, better sinusoidal patterns could be generated. Xian and Su demonstrated the area-modulated patterns can indeed generate high-quality sinusoidal fringe patterns with precise micro-manufacturing technique [5]. However, this technique requires the cell to be about 1 μm, which is still difficult to realize in a digital fringe projection system as the pixels are typically about ten times larger. William and Zhang proposed to approximate the triangular waveform by modifying 2×2 pixels [6], which showed the promise of improving 3D shape measurement quality when fringe stripes are narrow, but suffers if the fringe stripes are wide.

Dithering [7], also called halftoning, is the process of representing an image with fewer colors or bits than they are in the real image. This technique has been extensively employed in digital signal (e.g. audio, video) processing. FIGS. 1A to 1D illustrate a binary dithering technique for 8-bit grayscale images. FIG. 1A illustrates an original 8-bit image of a David head; FIG. 1B illustrates a binary dithered image of the image of FIG. 1A; FIG. 1C illustrates an original 8-bit sinusoidal structured pattern; FIG. 1D illustrates a binary dithered pattern of the image of FIG. 1C. FIGS. 1A to 1D indicate that the dithered images could represent the original images with good quality; and the binary pattern appears sinusoidal even before any processing. However, to our knowledge, there is no prior attempt to apply such a technique to 3D shape measurement. Thus, according to one aspect of the present invention, dithering techniques are used to optimize binary patterns.

We propose to apply the dithering technique to optimize binary patterns so that high-quality fringe patterns can be generated even when the stripes are very wide. Specifically, the desired sinusoidal fringe patterns are binarized using the ordered-dithering algorithm proposed by Bayer [8]. These binary dithered structured patterns are then sent to a nearly-focused or slightly defocused projector to produce ideal sinusoidal patterns, and then a fringe analysis technique can be used for high-quality 3D shape measurement. It is important to note that here the focus is on generating high-quality sinusoidal patterns with wide stripes for 3D shape measurement to overcome the problem of the existing binary defocusing technique, albeit the narrow ones can also be realized.

Section 2 presents the phase-shifting algorithm we are going to use. Section 4 shows some simulation result. Section 5 shows some experimental results, and Section 6 summarizes this portion of the present application.

2. Phase-Shifting Algorithm

We used a five-step phase-shifting algorithm to verify the performance of the proposed technique. For a five-step phase-shifting algorithm with a phase shift of $2\pi/5$, the fringe patterns can be described as, $$I_n(x,y) = I'(x,y) + I''(x,y)\cos(\phi + 2\pi n/5) \quad (1)$$

Where n=1, 2, ..., 5, I'(x,y) is the average intensity, I''(x,y) the intensity modulation, and $\phi(x,y)$ the phase to be solved for using the following equation.

$$\phi(x, y) = \tan^{-1}\left[\frac{\sum_{n=1}^{5} I_n(x, y)\sin(2\pi n/5)}{\sum_{n=1}^{5} I_n(x, y)\cos(2\pi n/5)}\right] \quad (2)$$

The arctangent function will result a value ranging $[-\pi, +\pi]$ with $2\pi$ discontinuities. A spatial or temporal phase unwrapping algorithm can be used to remove $2\pi$ discontinuities, and then 3D shape can be reconstructed from the unwrapped phase if the system is calibrated.

3. Binary Dithering Technique

Conventionally, sinusoidal patterns are generated by the computer and projected by the projector in a digital fringe projection system. Recently, our research showed that the binary patterns can also be used for high-quality 3D shape measurement when the projector is properly defocused. This technique is called the binary defocusing technique. The binary defocusing technique has many potential advantages: (1) no requirement for gamma calibration since only two grayscale values are used [9]; (2) no strict requirement for camera exposure time even when the digital-light-processing (DLP) projector is utilized [10]; and (3) possibilities of achieving unprecedentedly high-speed 3D shape measurement [11]. However, the binary defocusing technique is not trouble-free especially when the fringe stripes are wide where the high-order harmonics cannot be effectively suppressed by defocusing due to the limitation of the projector lens [4].

Dithering, which is one technique used to achieve satisfactory image rendering and color reduction, has the potential to tackle the aforementioned problem of the squared binary technique. A structured sinusoidal fringe pattern is typically stored as an 8-bit image with 256 gray-scale values. In contrast, a binary pattern is an 1-bit image that only requires 2 gray-scale values to represent. To approximate a sinusoidal pattern with a binary pattern, various dithering techniques can be used, such as the simple thresholding [12], the random dithering [12], the Bayer-ordered dithering [8], and the error-diffusion dithering [13] techniques. For the simple thresholding method [12], each pixel grayscale value is compared against a fixed threshold value: if it is larger than the threshold, the pixel is set to be 1, otherwise to be 0. This technique is very simple, yet it results in immense loss of details and contouring. The random dithering technique [12] could alleviate the problem of thresholding to some extent by comparing each pixel value against a random threshold. However, this technique still cannot preserve the details of the original image. The error-diffusion dithering technique [13] involves area operation since the quantization error residuals distribute to the neighboring pixels that have not been processed. Though working well for representing the grayscale images, the algorithm is not efficient since it is difficult to operate in a parallel manner.

Due to its good performance and easy operation, the Bayer ordered dithering technique [8] was adopted. The ordered dithering consists of comparing blocks of the original image to a 2-D grid of thresholds called dither patterns. Each element of the original block is quantized according to the corresponding threshold value in the dither pattern. The values in the dither matrix are fixed, but are typically different from each other. Because the threshold changes between adjacent pixels, some de-correlation from the quantization error is achieved. Bayer has shown that if the sizes of the matrices are $2^N$ (N is an integer), there is an optimal dither pattern that results in the pattern noise being as high-frequency as possible. It is well know that the high-frequency noise can be effectively reduced by applying a low-pass filter. The Bayer patterns can be obtained as follows, $$M_1 = \begin{bmatrix} 0 & 2 \\ 3 & 1 \end{bmatrix} \quad (3)$$

which is the smallest 2×2 base dither pattern. Larger dither patterns can be obtained using $$M_{n+1} = \begin{bmatrix} 4M_n & 4M_n + 2U_n \\ 4M_n + 3U_n & 4M_n + U_n \end{bmatrix} \quad (4)$$

where $U_n$ is n-dimensional unity matrix. Using these standard dither patterns, a grayscale image can be efficiently quantized depending upon the chosen size of dither pattern.

FIGS. 2A to 2E show the differences of different dithering techniques. FIG. 2B shows the result after applying the simple thresholding technique to binarize the image. it can be seen that almost all details are lost. The random dithering technique improves the simple thresholding technique, yet a lot details are still missing, as shown in FIG. 2C. The ordered Bayer dithering technique can well preserve most features of the original image. FIG. 2D shows the result after applying the ordered Bayer dithering technique. The binarized image of FIG. 2E using the error-diffusion dithering technique can also well represent the original image.

4. Simulation Results

We firstly verified the performance of the proposed technique through simulations. Fringe patterns with wide fringe stripes are generated by the binary dithering algorithm [8]. FIGS. 3A to 3F show two examples: one fringe pattern has a fringe pitch (T), number of pixels per fringe period, of 600, and the other has a fringe pitch of 150. FIGS. 3A to 3D show the dithered patterns and their associated Gaussian smoothed patterns. It is interesting to see that even before applying a Gaussian smoothing filter, the patterns visually appear good sinusoidality. Even though the Gaussian filter is quite small (size of 9×9 pixels with a standard deviation of 3.0 pixels), the resultant patterns depict clear sinusoidal structures. FIGS. 3B to 3E show the horizontal cross sections of the blurred patterns. To better visualize the sinusoidality of these blurred patterns, the frequency-amplitude spectra of cross sections were plotted in FIG. 3C and FIG. 3F. These figures clearly show that high-frequency harmonics almost completely disappear, which means that they are good-quality sinusoidal.

We further simulated the influence of different amounts of defocusing by varying the Gaussian filter size (Fs) with the standard deviation being always $F_s/3$. The phase was calculated by using the aforementioned five-step phase-shifting algorithm; and the resultant phase errors are calculated by comparing with the phase obtained from the ideal sinusoidal fringe patterns. FIG. 4C shows the root-mean-square (rms) error percentages. The error percentages were calculated as the ratios based of rms error and the total phase for the same size image. In our case, T=150 has a total phase of 8π and T=600 has 2π since the image has a resolution of 600×600. In these simulations, we used filter sizes of Fs=5, 7, 11, 15, 19, 23, 27, 39 pixels, for levels 1 through 8. These simulations show that 1) the phase errors are all very small (approximately 0.4% for T=600 pixels) even when fringe patterns are almost in focus (top images in FIG. 4A and FIG. 4B); and 2) the phase error reduces when the patterns with the increase of amount of defocusing. This means that the proposed technique can be used for large depth range 3D shape measurement, because the measurement can start from almost in focus to significantly defocused.

5. Experimental Results

We also developed a 3D shape measurement system to verify the proposed method. In this system, we utilized a digital-light-processing (DLP) projector (Samsung SP-P310MEMX) and a digital CCD camera (Jai Pulnix TM-6740CL). The camera is attached with a 16 mm focal length Megapixel lens (Computer M1614-MP) with an image resolution is 640×480. The projector has 800×600 resolution and has 0.49-2.80 m projection distance.

The phase error caused by different amounts of defocusing was experimented first. In this experiment, a white flat board was measured, and the amount of defocusing was realized by manually adjusting the focal length of the projector. The projector was adjusted from nearly focused to significantly defocused. We used the dithered patterns generated in FIGS. 3A to 3F and two fringe pitches (T=600 and T=150) to determine the phase error percentage for each case. The phase error is calculated, again, by comparing the phase obtained from the dithered patterns with the phase obtained the ideal sinusoidal fringe patterns. To reduce the noise influence of the ideal sinusoidal fringe patterns, the fringe pitch used for the ideal sinusoidal fringe patterns is much smaller (T=30). FIGS. 5A to 5C show the results. It can be seen that the projector starts with nearly focused to significantly defocused, but the phase error all remain small (less than 0.6% even for the wide fringe, T=600). Clearly, these experimental results are similar to our simulation results, and thus confirmed one merit of the proposed technique: suitable for large depth range 3D shape measurement.

Figures 6A, 6B, 6C:
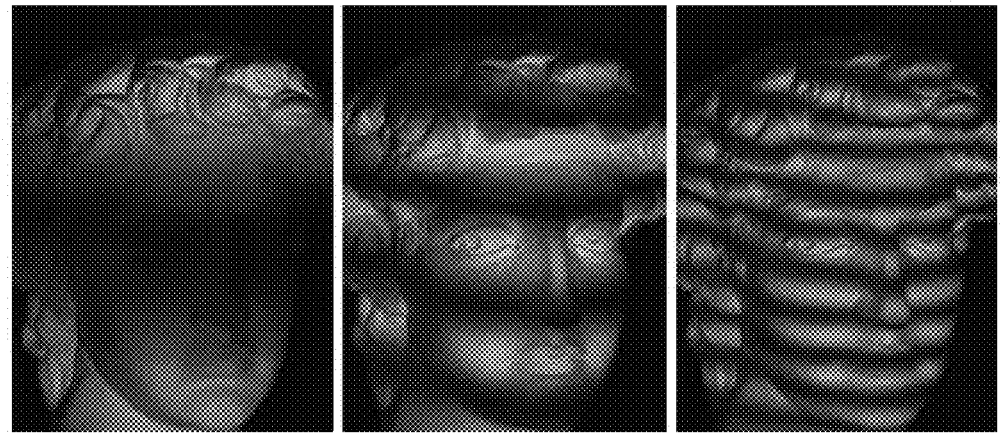
FIG. 6A to 6I illustrate experimental results of measuring a complex 3D object.
Figures 6D, 6E, 6F:
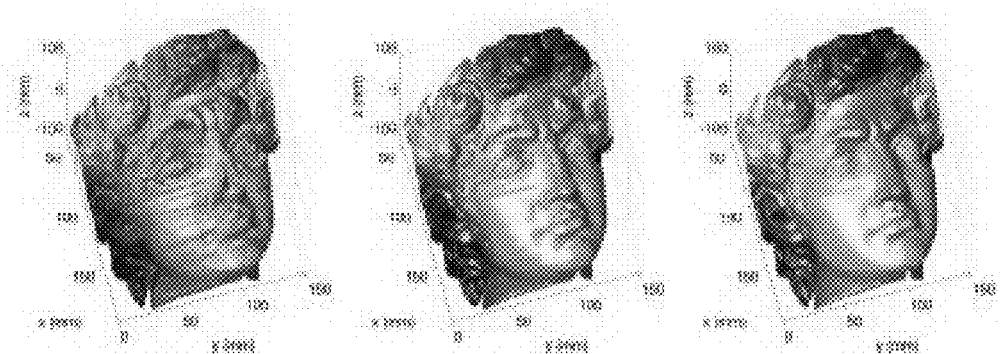

We also measured a complex 3D object, David head shown in FIG. 1A. FIGS. 6A to 6I show the measuring results with different fringe breadths (T=600, 150, and 60). During all the measurements, the projector and the camera remain untouched. To test our proposed technique, we firstly used the dithered patterns with projector being slightly defocused. FIGS. 6A to 6C show the representative captured fringe patterns with different fringe breadths. Five phase-shifted dithered patterns are captured and used to recover the 3D shape. FIGS. 6D to 6F show the 3D result for each case. It is not necessary to unwrap the phase from the widest fringe patterns, because the single fringe covers the whole measurement range. The narrower phase maps are unwrapped with the assistance of the phase from the largest fringe period using a temporal phase-unwrapping algorithm. To convert the unwrapped phase to depth, we used a simple phase-to-height conversion algorithm described in Reference [14]. It is well known that when fringe stripes are wide, the random noise is very large; and with the fringe period decreasing, the quality of the 3D results becomes better. The experimental results shows that the 3D shape measurements are of very high-quality when the fringe period is T=60.

Figures 6G, 6H, 6I:
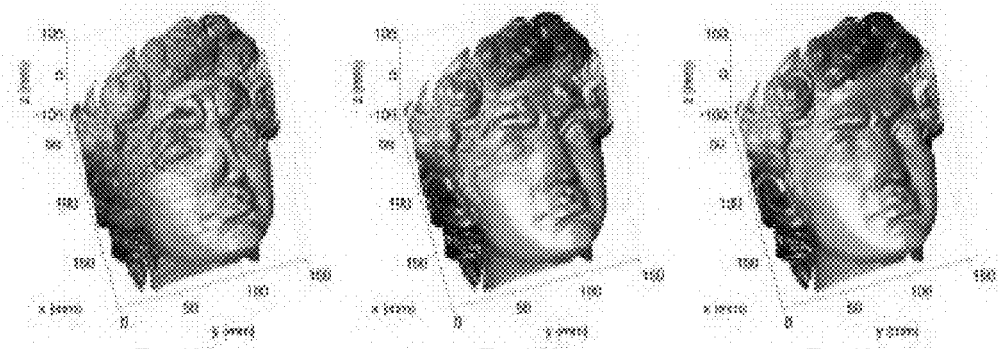

To evaluate the measurement quality, we also did experiment using sinusoidal fringe patterns. FIGS. 6G to 6I show the corresponding results with the same fringe size and the same phase shifting algorithm. The nonlinearity of the projector was corrected using the approach described in Reference [15]. This experiment clearly shows that the measurement quality using the proposed technique is comparable to that using the conventional techniques after the projector's nonlinearity corrections; but the proposed technique does not need any nonlinearity correction because it naturally utilizes the binary patterns.

6. Conclusion

We have presented a novel 3D shape measurement technique using the binary dithered patterns and the phase-shifting technique. This method overcomes one of the challenges of the existing binary defocusing techniques: difficult to generate high-quality sinusoidal fringe pattern when fringe stripes are very wide. Both simulation and experimental results have demonstrated the success of the proposed method.

B. Genetic Method to Optimize Binary Dithering

Digital fringe projection (DFP) techniques have been increasingly employed due to their flexibility and speed [16]. A DFP system utilizes a computer to generate sinusoidal fringe patterns that are projected onto an object by a projector, a camera captures the fringe patterns distorted by the object surface geometry, and a fringe analysis algorithm is used to reconstruct 3D shape. However, since it requires 8 bits to represent sinusoidal patterns, the measurement speed is typically limited to 120 Hz (the video projector refresh rate).

The squared binary defocusing technique can achieve tens of kHz since it only requires 1-bit structured patterns [11]. However, its measurement quality is not as high as the DFP technique due to the influences of high frequency harmonics. Pulse width modulation (PWM) techniques [2, 3] could substantially enhance the binary defocusing technique when fringe stripes are narrow. Yet, the improvements were limited when fringe stripes are wide. This is because the PWM techniques are one dimensional in nature, and cannot fully utilize 2D information of the structured patterns.

The area-modulation technique developed by Xian and Su [5] could generate high-quality fringe patterns, yet is difficult to realize in a DFP system due to the requirement of highly dense pixels. Locally modulating the 1s and 0s ratios could result in patterns better for defocusing technique [6]. However, it is also difficult for these techniques to achieve high-quality wide fringes.

Since 1960's [7], researchers have been developing methods to represent grayscale images with binary images for printing: the technique developed was called haftoning or dithering. Numerous dithering techniques have been developed that include the random dithering [12], the ordered dithering [8], and the error diffusion [13] techniques. Our previous study [17] showed that the dithering techniques could substantially enhance 3D shape measurement quality when fringe stripes are wide, but had a limited improvement when fringes are dense. All these dithering techniques were simply applying a single matrix to convert an 8-bit grayscale image to a 1-bit binary image, ignoring the inherent structures of an image. Since the required fringe patterns have sinusoidal structures, there should be great room for drastically improving the fringe quality.

According to one aspect of the invention, a genetic algorithm is used to optimize the dithering technique for sinusoidal structured pattern generation. The proposed genetic algorithm takes full advantage of the inherent sinusoidal structures of the desired patterns, and optimizes 1s and 0s distributions such that better sinusoids can be generated. The proposed method is a genetic algorithm that produces better genes through mutations and crossovers from the dithered patterns. Both simulation and experimental results will show that this proposed algorithm can substantially improve fringe quality.

Among all existing dithering techniques, the error-diffusion dithering techniques have been most extensively adopted due to their higher accuracy. In this method, the pixels are quantized in a specific order by applying a diffusion kernel h(x; y), and the quantization error for the current pixel is propagated to unprocessed pixels. The process of modifying an input pixel can be described as, $$\tilde{f}(i,j) = f(i,j) + \Sum_{k,l \in s} h(k,l) e(i-k,k-l) \quad (5)$$

Here, f (i; j) the original image, b (i; j) the quantized image, and error e (i; j) the difference between the quantized image pixel and the diffused image pixel including the prior processed pixel influences. The quantization error e (i; j) is further diffused to unprocessed pixels through the diffusion kernel h (i; j). There are numerous diffusion kernel selections, and we use the kernel proposed by Floyd-Steinberg [12]:

$$\frac{1}{16} \begin{bmatrix} - & * & 7 \\ 3 & 5 & 1 \end{bmatrix} \quad (6)$$

Here, - represents the previously processed pixels, and * the pixel in processing. One may notice that the kernel coefficients sum to one, and thus this operation preserve the local average value of the original image.

Since the error-diffusion pattern is simply applying a matrix to the image, it is far from optimal. Therefore, according to one aspect of the present invention, a genetic algorithm is used to optimize the dithering technique such that better sinusoids can be generated. The genetic algorithm starts with the dithered patterns using the error-diffusion algorithm.

Figures 7A, 7B, 7C, 7D:
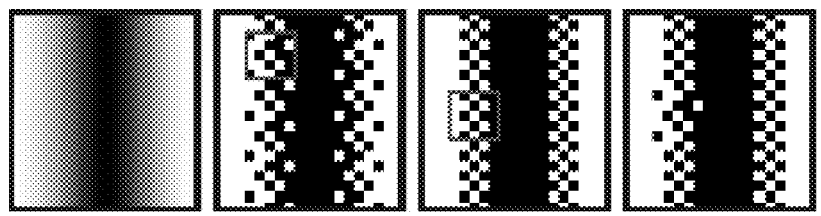
FIGS. 7A to 7D illustrate a crossover example.

Since the error-diffusion algorithm is path and origin dependent, different variations (genes) can be generated. FIGS. 7B and 7C show two variations with one starting from the top left corner and diffusing, and the other staring from bottom left and corner and diffusing. The diversity of variations within genes will speed up the optimization process. The proposed genetic algorithm was designed to have a population of 20 patterns for each generation, and individuals within each generation were evaluated using a fitness function. The probability of choosing one individual as the parent of next generation was calculated using the rank selection method discussed in Ref. [21].

To emulate projector defocusing effect, the pattern was first blurred by a small Gaussian filter (e.g., size of 5 of 5 and a standard deviation of 5/3 pixels). Then, the intensity of this blurred image at each pixel was compared to the ideal image. The difference between the two was defined as the fitness function to be minimized. The proposed genetic algorithm utilized two major techniques, crossover, and mutation.

Crossover is a technique that copies a block of one pattern to the other. This happens when two parents had been chosen based for recombination, a random rectangle from the first parent was chosen with a random starting location and random width and height with both width and height less than the fringe period. The random starting location from the second parent was chosen with a constraint of ensuring the same phase. To improve the efficiency of the crossover process, the rectangle was chosen to lie in a region that had a higher error for about 50% of the time. This ensures that the algorithm will avoid wasting too much time on those areas that had already been optimized. FIGS. 7B to 7D illustrate one crossover (inside the rectangle) from FIG. 7B to FIG. 7C.

While crossover was the primary driver, with approximately 80% of children having crossover from two parents, the importance of mutations cannot be overlooked. In fact, "mutation serves to create random diversity in the population, while crossover serves as an accelerator that promotes emergent behavior from its components" [19]. This research employed a few different strategies.

The primary method of mutation was bit-flip: changes 1s to 0s or 0s to 1s. We also adopted bit-switching: switching pixels within 4×4 pixels region. High-error (or low fitness) bits were more likely undergo recombination or flipped. Similar to crossover, about 50% of Mutations occur on bits with a larger errors to speed up the whole process.

Due to the slow speed of computing the genome fitness value, no more than one mutation would occur for any child. If we assume the probability $p_s < 1$ that any mutation will be successful, then the probability of two mutations far apart both being successful will be less than the probability of only one mutation being successful, i.e., $p_s^2 < p_s$. If we remove the restriction that the two pixels will be far apart, and instead only consider when the pixels are close, then we have two cases: 1) The pixels have the same value, in which case it is far more likely that one flip would be successful rather than two; and 2) the pixels have differing values, in which case they could still be bit-switched.

Figures 8A, 8B, 8C, 8D:
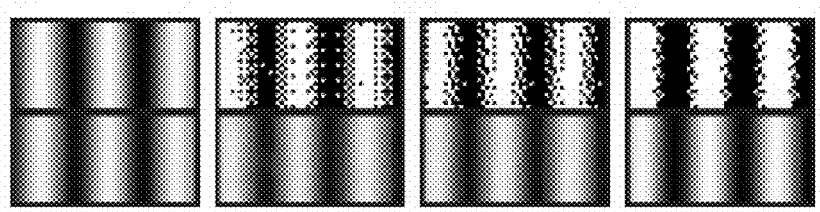
FIGS. 8A to 8F illustrate patterns with different techniques.
Figure 8E:
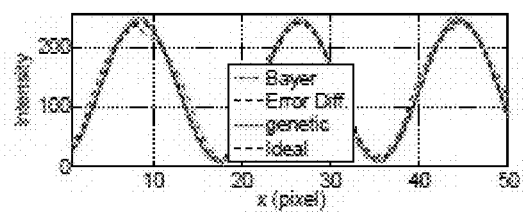
Figure 8F:
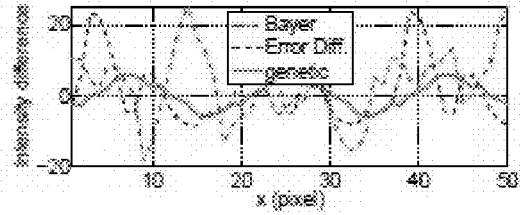

We firstly performed some simulations with a wide range of fringe breadths. FIGS. 8A-8F show the example when fringe is dense (fringe period of 18 pixels). FIGS. 8B to 8D top half images show the dithered patterns, and the bottom images show the smoothed patterns with a Gaussian filter (size 5×5 and standard deviation of 5/3 pixels). The cross sections of these smoothed patterns were plotted in FIG. 8E. FIG. 8F show the differences between these patterns and the ideal sinusoidal pattern. These figures show that the genetic optimized pattern is closer to the ideal pattern.

Figure 9A:
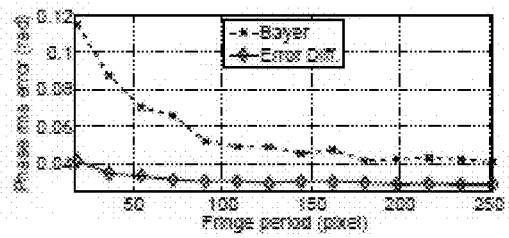
FIGS. 9A to 9D illustrates results with different dithering techniques.
Figure 9B:
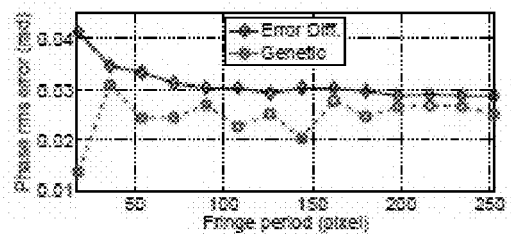

Since the phase quality determines the measurement quality, the phase was also calculated using a three-step phase-shifting algorithm and a temporal phase unwrapping framework discussed in [20]. The phase errors were calculated by comparing them with the phase obtained from ideal sinusoidal patterns. FIGS. 9A and 9B respectively show the comparison of the phase root-mean-square (rms) errors for different techniques with different fringe periods. This clearly shows that the proposed genetic algorithm works the best while the error-diffusion technique works better than the Bayer diffusion technique. One may also notice that both Bayer and error-diffusing dithering techniques showed larger errors when fringes are dense, whilst the genetic optimization method performed well even when fringe stripes were very dense.

The proposed technique was also verified with a previously developed 3D shape measurement system that includes a digital-light-processing (DLP) projector (LogicPD Light-Commander) and a charge-coupled-device (CCD) camera (Jai Pulnix TM-6740CL). The camera was attached a 16 mm focal length Mega-pixel lens (Computar M1614-MP), and the projector was attached with a 50 mm focal length Mega-pixel lens (Sigma SI2418MNAF). The projector and the camera remained untouched for these experiments.

Figure 9C:
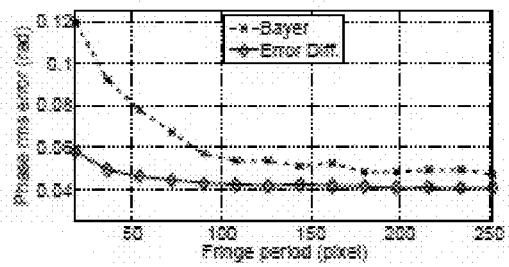
Figure 9D:
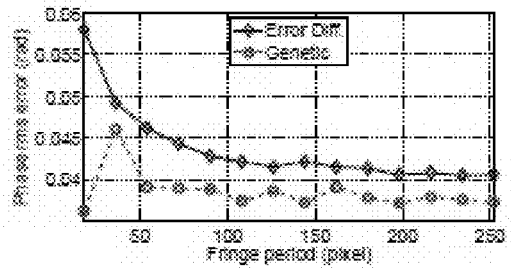

We experimentally verified the simulation results by measuring a at white surface using all these fringe patterns. FIGS. 9C to 9C show the results. The phase errors were calculated by taking the difference between the phase recovered from the ideal sinusoidal fringe patterns with that from the dithered patterns. Again, the genetic optimized algorithm generated the best results while the Bayer dithering performs the worst.

A more complex 3D statue was also measured to compare these methods. FIG. 10 shows the results. One can notice that the patterns are nearly focused as the binary structures are obvious on the captured images. In this example, the fringe period used is 18 pixels, and the phase was converted to depth using the simple reference-plane based method discussed in Ref. [11]. This, once again, demonstrated that the genetic algorithm substantially improve the measurement quality even when the projector is nearly focused and the fringe stripes are narrow.

This letter has presented a genetic algorithm to optimize the dithering technique. Both simulation and experiments demonstrated that the success of the proposed technique for substantially improving fringe quality for both narrow and wide fringes.

C. 3D Absolute Shape Measurement of Live Rabbit Hearts with a Superfast Two-Frequency Phase-Shifting Technique 1. Introduction Accurate measure of the 3D dynamic surface geometry of the beating heart is vital to improving our understanding of mechanics in health and disease. However, because the optical properties of heart surfaces (i.e., partially shiny and highly absorbing), it is quite challenging for an optical method to perform such measurement with minimum error. The measurement becomes even more challenging when the heart is rapidly beating (e.g., around 180 beats/min, or 3 Hz, for an explanted rabbit heart) since a very high-speed 3D shape measurement system is required. According to one aspect of the present invention, a novel 3D shape measurement technique to conquer these challenges.

Optical methods have been extensively adopted in measuring soft objects (e.g., human faces). Phase-shifting-based fringe analysis techniques have the advantage of measuring challenging surfaces (e.g. low surface contrast) while achieving high spatial and temporal resolution. Digital fringe projection (DFP) methods have been extensively adopted due to the flexibility of system development and high achievable speed [16]. However, it is extremely difficult for conventional DFP techniques to achieve faster than 120 Hz which is the maximum refresh rate of a digital video projector. Therefore, it is difficult for such techniques to precisely measure beating hearts, like that of the rabbit.

Binary defocusing has enabled tens of kHz rate 3D shape measurement speed because it only requires 1-bit structured patterns rather than 8-bit grayscale patterns [11]. However, measurement error is large if the projector is not properly defocused [14]. Unfortunately, due to the low contrast of the heart surface, the projector has to be nearly focused to achieve the highest possible fringe contrast. Thus, measurement accuracy and determination of mechanical parameters like surface strain becomes compromised. Techniques based on 1-D pulse width modulation (PWM) [2, 3] have been proposed to improve the binary defocusing technique. They prove successful when the fringe stripes are narrow, yet fail when fringe stripes are wide. The PWM technique has been successfully applied to measure beating rabbit hearts, but requires a gray-coding method and employs a computational framework to recover absolute 3D shape [22]. As a result of the gray-coding method, more than six (ten in our previous study) images are required to recover one 3D frame. For high-speed applications, it is desirable to use fewer number of fringe patterns to reduce motion induced artifacts.

Dithering techniques have been successfully used in printing technology to represent grayscale images with binary images [7]. Recently, we have introduced the ordered-Bayer dithering technique to the 3D shape measurement field to generate high quality fringe patterns even for wide fringe stripes [17]. We found that the dithering technique cannot substantially improve measurement quality when the fringe stripe is narrow, yet it provides the potential to generate high-quality sinusoidal fringe patterns with low spatial frequency using the binary defocusing method.

Here, we combine the PWM technique with the dithering technique to obtain absolute phase with only six fringe patterns. Specifically, we utilize the optimal pulse width modulation (OPWM) technique [2] to generate three high-frequency sinusoidal fringe patterns, and the dithering technique to produce three low-frequency fringe sinusoidal fringe patterns. By adopting a two-frequency phase-shifting technique, the absolute phase is determined. Instead of using the ordered-Bayer dithering technique, a better technique called error-diffusion dithering is introduced to generate better low-frequency fringe patterns. Since measuring beating rabbit hearts is the ultimate goal of this study, we also address some practical considerations for measuring the cardiac deformation. First, we investigation the effect of wavelength of the projected fringe patterns on measurement quality. Optical properties of cardiac tissue (i.e., absorption, reflectance, and transmission) play an important role in measurement error. Experimental data will be presented to show the differences for beating hearts and formalin-fixed hearts. Additionally, we investigate the minimum measurement speed to minimize both data size and motion induced artifacts.

Section 2 explains the principles of proposed techniques. Section 3 shows some experimental results, and Section 4 summarizes.

2. Principle 2.1. Two Frequency Phase-Shifting Technique for Absolute Phase Retrieval Phase-shifting methods have been extensively adopted in optical metrology because of their measurement speed and accuracy. Over the years, a variety of phase-shifting algorithms have been developed, that include three-step, four-step, and least-square algorithms [23]. For high speed 3-D shape measurement, a three-step phase-shifting algorithm with a phase shift of $2\pi/3$ is commonly used. The three fringe images can be described as:

$$I_1(x,y)=I'(x,y)+I''(x,y)\cos(\phi-2\pi/3) \quad (7)$$

$$I_2(x,y)=I'(x,y)+I''(x,y)\cos(\phi) \quad (8)$$

$$I_3(x,y)=I'(x,y)+I''(x,y)\cos(\phi+2\pi/3) \quad (9)$$

Where I'(x; y) is the average intensity, I"(x; y) the intensity modulation, and $\phi(x,y)$ the phase to be solved for. Simultaneously solving Eq. (7)-(9), the phase can be obtained $$\phi(x,y)=\tan^{-1}[\sqrt{3}(I_1-I_3)/(2I_2-I_1-I_3)] \quad (10)$$

This equation provides the wrapped phase with $2\pi$ discontinuities. A spatial or temporal phase unwrapping algorithm can be applied to obtain continuous phase.

We utilized a two-frequency temporal phase-unwrapping algorithm to unwrap the phase. Essentially, two wrapped phase maps, low frequency phase $\phi^l$ and high-frequency $\phi^h(x, y)$. $\phi^l(x,y)$ is obtained from wide fringe patterns with a single fringe covering the whole measuring range, such that no phase unwrapping is required. By referring to $\phi^l(x, y)$ point by point, $\phi^h(x,y)$ is unwrapped to obtain a continuous phase map, $\Phi(x,y)$. Because 3D information is carried on by the phase, 3D shape can be reconstructed from the unwrapped phase $\Phi(x,y)$ using a phase-to-height conversion algorithm [14].

2.2. Optimal Pulse Width Modulation (OPWM) Technique to Modulate High-Frequency Patterns The recently proposed binary defocusing technique can greatly improve the measurement speed of DFP methods. However, when the projector is nearly focused, serious phase errors will arise due to the effects of high-order harmonics [4]. Therefore, here, OPWM is adopted to generate high-frequency patterns. This technique selectively eliminates undesired frequency components by inserting different types of notches in a conventional binary square wave. With slight projector defocusing, ideal sinusoidal fringe patterns can then be generated.

Figure 11:
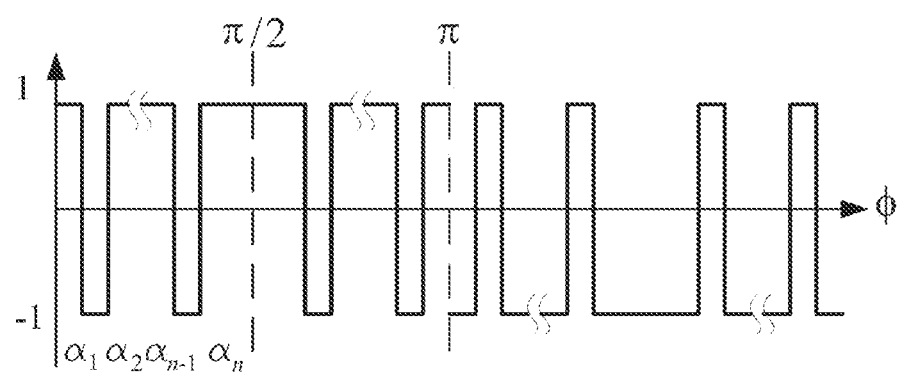
FIG. 11 illustrates a quarter-wave symmetric OPWM waveform.

FIG. 11 illustrates a general quarter-wave symmetric OPWM pattern. The square wave is chopped n times per-half cycle. For a periodic waveform with a period of $2\pi$, because it is an odd function, only the sine terms are left with the coefficients being described as:

$$b_k = \frac{4}{\pi} \int_{\theta=0}^{\pi/2} f(\theta)\sin(k\theta)d\theta \tag{11}$$

The n chops in the waveform provide n degrees of freedom to eliminate n−1 selected harmonics while keeping the fundamental frequency component within a certain magnitude. Due to the ability to eliminate undesired high-order harmonics, OPWM waveform could become sinusoidal after applying a small low-pass filter, which is similar to a small degree of defocusing. Our previous research has shown the success of OPWM technique [4].

2.3. Error-Diffusion-Based Dithering Technique to Modulate Low-Frequency Patterns Due to the high-order harmonics, it is very difficult to achieve low-frequency patterns for the binary defocusing technique. We have recently introduced the dithering technique to generate high-quality fringe patterns for wide fringe stripes [17]. Binary dithering is one of the techniques extensively used to render color or grayscale images with only 1-bit images. It has been used to process both digital audio and video data. There are numerous dithering techniques developed including random dithering [12], ordered dithering [8] and error-diffusion dithering [13]. Among these dithering techniques, the sophisticated error-diffusion dithering techniques have been most extensively adopted because they can represent the original image or signal with higher fidelity compared to simpler dithering algorithms. In this method, the pixels are quantized in a specific order, and the quantization error for the current pixel is propagated forward to local unprocessed pixels. By this means, the local average of the converted image is close to the original one.

The process of modifying an input pixel by prior quantization errors can be mathematically described as, $$\tilde{f}(i,j) = f(i,j) + \Sigma_{k,l \in S} h(k,l) e(i-k, j-l) \tag{12}$$

Here, f(i,j) is the original image, b(i,j) is the quantized image, and error e(i,j) is the difference between the quantized image pixel and the diffused image pixel including the prior processed pixel influences. The error e(i,j) of quantizing the current pixel is further diffused to its neighboring pixels by means of a two-dimensional weighting function h(i,j), known as the diffusion kernel. There are numerous error-diffusion dithering algorithms differing on the diffusion kernel selection. Here, we use the kernel proposed by Stucki [24], $$h = \begin{bmatrix} - & - & * & 8/42 & 4/42 \\ 2/42 & 4/42 & 8/42 & 4/42 & 2/42 \\ 1/42 & 2/42 & 4/42 & 2/42 & 1/42 \end{bmatrix} \tag{13}$$

Here, - represents the previously processed pixels, and * represents the pixel in processing. It should be noted that the kernel coefficients sum to one, and thus the local average value of the quantized image will be equal to the local average of the original one.

Figure 12C:
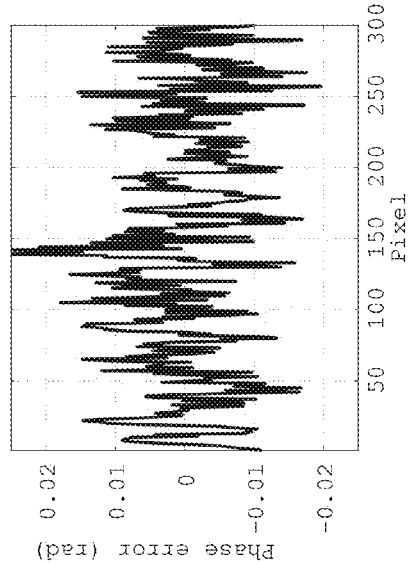
FIGS. 12A to 12F illustrates a comparison of Bayer dithering and error-diffusion dithering.
Figure 12F:
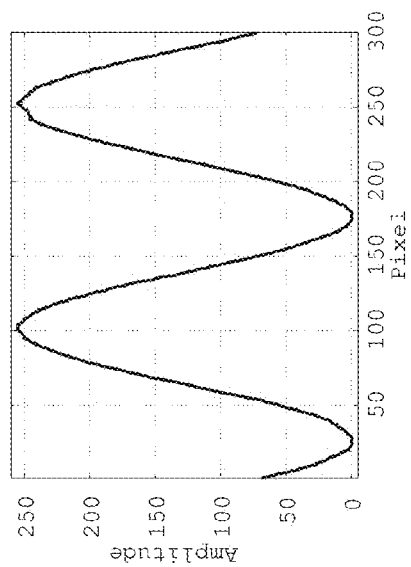
Figure 12B:
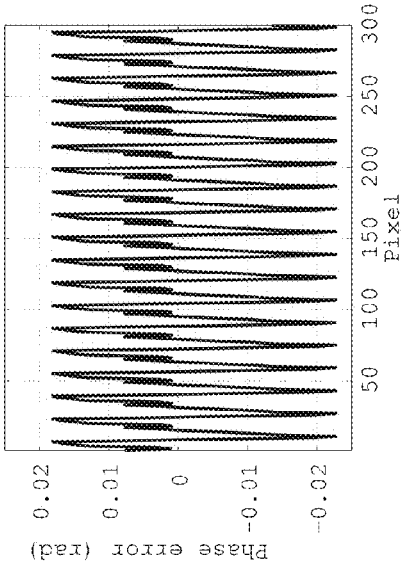
Figure 12E:
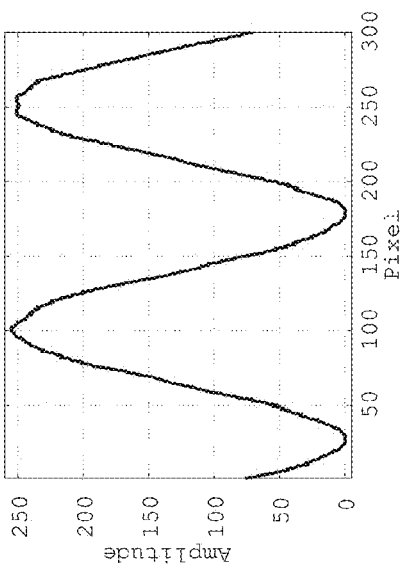
Figure 12A:
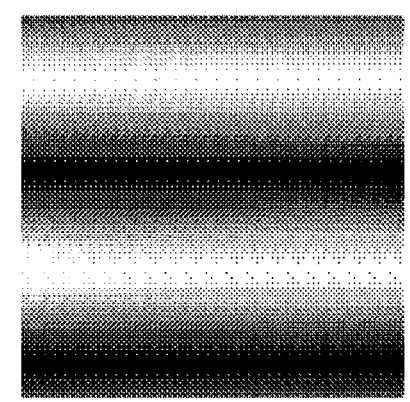
Figure 12D:
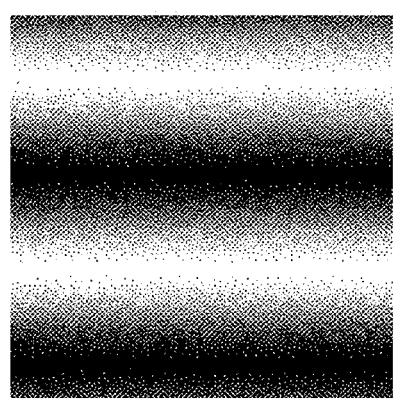

According to another aspect of the present invention, we introduce this dithering technique to convert 8-bit sinusoidal fringe pattern into 1-bit binary patterns. By combining with the defocusing technique, high-quality sinusoidal patterns with wide fringe stripes can be achieved. FIGS. 12A to 12F illustrate a simulation example with generating a sinusoidal fringe pattern with a fringe pitch (number of pixels per fringe period) of 150 pixel. The original sinusoidal fringe pattern is dithered with the ordered-Bayer dithering technique [17] and the error-diffusion dithering technique with the kernel described in Eq. (7). This simulation results show that the resultant image (FIG. 12D) from the error-diffusion dithering appears better than that (FIG. 12A) from the ordered-Bayer dithering before defocusing (or blurring). Three phase-shifted fringe patterns are generated for each dithering technique, and these patterns are smoothed by a small Gaussian filter (9×9 pixels in dimension with a standard deviation of 3 pixels) to emulate the effect introduced by a small amount of defocusing. After smoothing, the cross sections of these patterns are shown in FIG. 12B and FIG. 12E. These smoothed patterns are further processed to obtain the phase maps using a three-step phase-shifting algorithm. The phase errors can be determined by comparing with the ideal phase obtained from the ideal sinusoidal fringe patterns. FIG. 12C and FIG. 12F show the cross sections of the phase errors. It clearly shows that the error-diffusion dithering method is significantly better than the ordered-Bayer dithering method. Therefore, instead of using the ordered-Bayer dithering technique, we utilize the error-diffusion dithering technique to generate the low-frequency sinusoidal fringe patterns.

3. Experiments

3.1. Experimental System Setup

Figure 13:
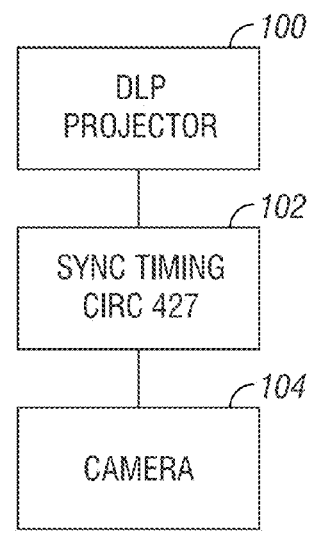
FIG. 13 illustrates a block diagram of a live heart measurement system.

FIG. 13 illustrates a block diagram of the system we developed. It is composed of a digital-light-processing (DLP) projector 100 (such as a DLP LightCrafter, Texas Instruments, TX), a high-speed CMOS camera 104 (such as a Phantom V9.1, Vision Research, NJ). The RGB LEDs used in this projector are (R:OSRAM LEAS2W 617 nm; G: OSRAM LCG H9RN 529 nm; B: OSRAM LEBS2W 464 nm). The camera is triggered by an external electronic circuit 102 that senses timing signal of the DLP projector. For all experiments conducted in this research, the camera was set to capture images with a resolution of 576×576, and both the projector and the camera were focused and remained fixed. The camera lens aperture was adjusted to ensure that the brightest possible fringe patterns were captured.

3.2 Live and fixed rabbit heart preparation

We imaged both formalin-fixed (10% formalin, n=1) and Langendorff-perfused hearts (n=2) isolated from New Zealand white rabbits. All studies were approved by the Institutional Animal Care and Use Committee of Washington University in St. Louis. The formalin-fixed heart was used for experimental validation of a stationary heart as described below. Langendorff-perfused hearts, conversely, were used to verify motion-induced artifacts. While this ex vivo, Langendorff-perfused model does not completely capture in vivo cardiac mechanics due to unloading during removal, it nevertheless provides a means to validate our system on a dynamically deforming heart. Each heart was removed via a mid-sternal thoracotamy and immediately perfused with oxygenated (95% O2, 5% $CO_2$) Tyrode's solution at a constant pressure of 60±5 mmHg and temperature of 37° C. Insulin (200 mg/dL) was also added to the perfusate to improve glucose utilization by the heart. Once cannulated, hearts were placed in a custom superfusion chamber with an optical window for structured light imaging. Ag/AgCl electrodes were placed near the atrioventricular (AV) groove to record ECG measurements during experimentation.

3.3. Experimental Verification 3.3.1. Formalin-Fixed Rabbit Heart Measurement

Figure 14D:
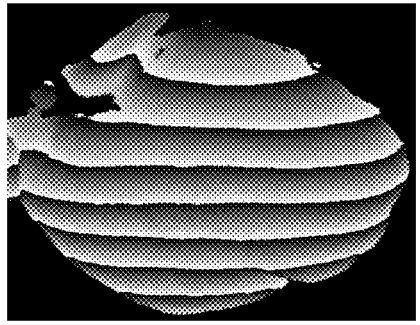
FIGS. 14A to 14H illustrate wrapped phase maps for dead heart measurement.
Figure 14C:
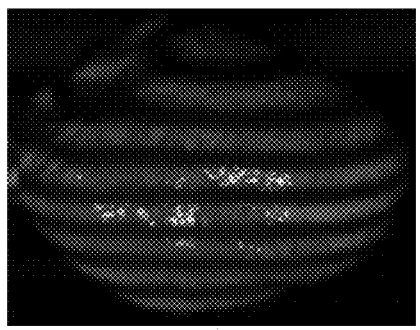
Figure 14B:
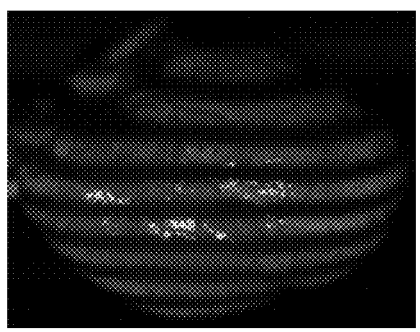
Figure 14A:
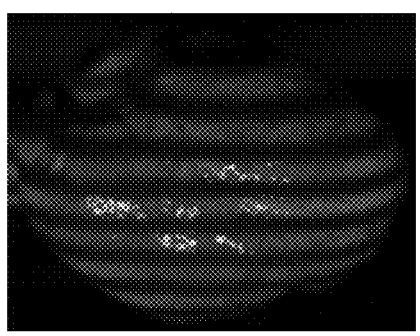
Figure 14H:
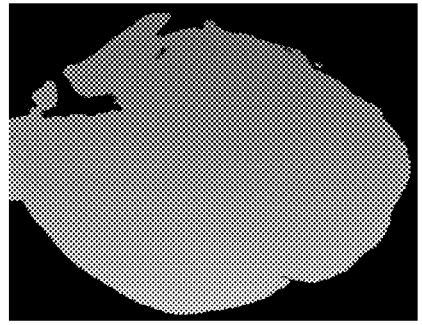
Figure 14G:
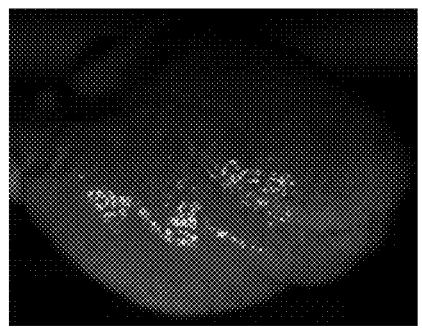
Figure 14F:
Figure 14E:
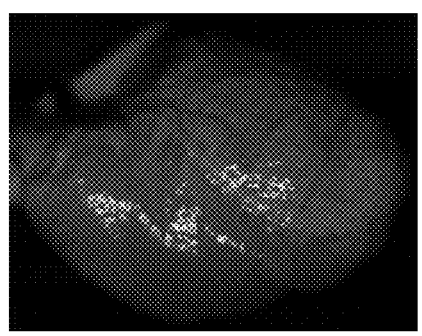

FIGS. 14A to 14G illustrates the phase-shifting algorithms we adopted by measuring a formalin-fixed rabbit heart. FIGS. 14A to 14C show three high-frequency phase-shifted fringe patterns that used the OPWM patterns. It is important to note that these patterns have very obvious binary structures, but we will show that high-quality 3D shape measurement can still be achieved due to the use of OPWM technique. FIGS. 14E to 14G show three low-frequency fringe patterns that used the dithered patterns. Applying Eq. (10) to three phase-shifted fringe patterns, the wrapped phase of both frequencies can be obtained. FIG. 14D shows the high-frequency wrapped phase map, which possesses $2\pi$ phase discontinuities. The low-frequency wrapped phase, as shown in FIG. 14H, is continuous without $2\pi$ discontinuities. By referring to the phase map obtained from the low frequency patterns, the high-frequency wrapped phase can be unwrapped point by point. FIG. 15A shows the unwrapped phase. In this research, we used the approximate phase-to-height conversion approach introduced in Reference [14] to calibrate the system. After calibration, the 3D shape can be recovered. FIG. 15B shows the 3D shape measurement results of the heart surface.

Figure 16A:
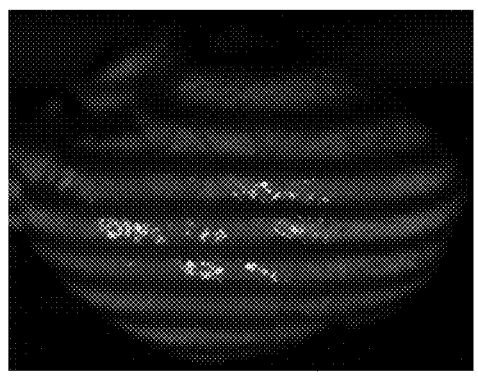
FIGS. 16A to 16F illustrate a comparison of different spectrum for fixed heart measurements.
Figure 16B:
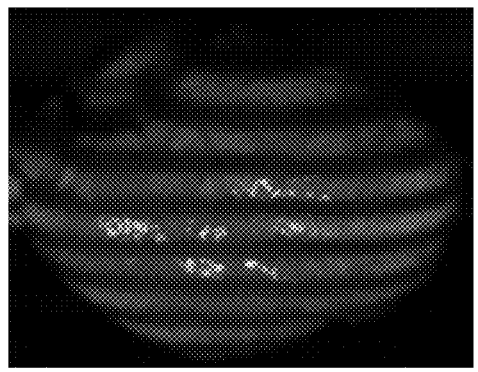
Figure 16C:
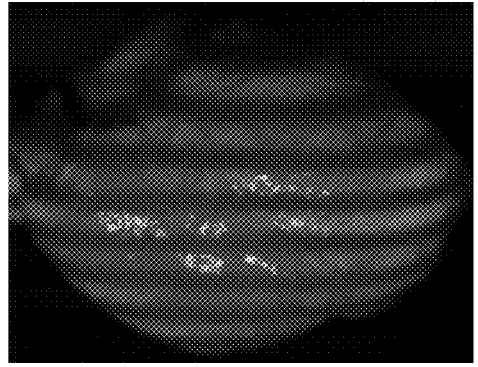
Figure 16D:
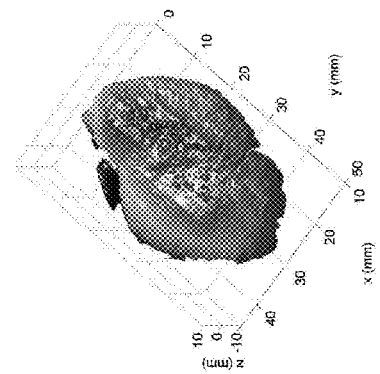
Figure 16E:
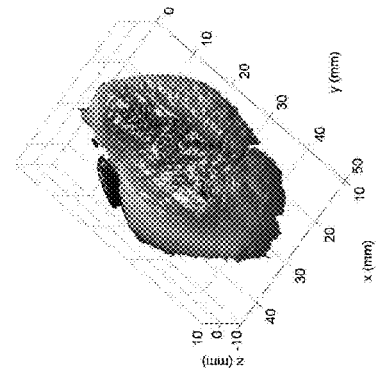
Figure 16F:
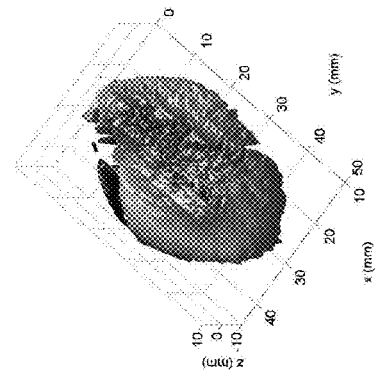

FIGS. 16A to 16F show a comparison of different projection wavelengths on the formalin-fixed heart with blue, green, and red lighting sources. The contrast of FIG. 16A is better than FIG. 16B and FIG. 16C. FIGS. 16D to 16F show the corresponding reconstructed 3D shapes of the fixed heart. There are slight differences among these measurement, but surface measurement quality is high regardless of the spectrum of light used.

3.3.2. Beating Rabbit Heart Measurement: Spectrum of Light Influence

As mentioned previously, we measured a beating rabbit heart with different projection wavelengths to investigate the combination of motion artifacts and light-tissue interaction on surface measurement quality. FIGS. 17A to 17C show the comparing results. FIGS. 17A to 17C respectively show the fringe patterns when the blue, green and red light was used. In comparison with fringe patterns captured for a fixed heart shown in FIGS. 16A to 16C, the fringe contrast varies drastically for different wavelengths. FIGS. 17D to 17F show the corresponding reconstructed 3D results. Here, we used the projection speed of 2,000 Hz to ensure no motion induced artifacts. To fairly compare data recorded from red, green, and blue wavelengths, frames were selected from the same specific phase in the cardiac cycle. Unlike the fixed heart, the beating rabbit heart measurement results vary drastically the projector light wavelength, with blue light giving the best results and red light giving the worst results. Specifically, surface reconstructions from blue light appear to have smoother surface geometry and fewer fringe artifacts. We believe one possible cause for this is the optical properties of rabbit cardiac tissue for blue light relative to green or red. Blue light with a wavelength of 464 nm will have low penetration into cardiac tissue and high scattering compared to green or red light. As a result, measurement error from red and green light could be a result of light contributions from mid-myocardial light scattering and not simply light reflecting from the epicardial surface [25]. Fixation of cardiac tissues increasing scattering and may explain the wavelength independence we observed in our formalin fixed heart measurements. Based on these observations, only blue light was utilized for our other beating heart experiments.

3.3.3. Live Rabbit Heart Measurement: Measurement Speed Influence

Typically, an explanted rabbit heart beats at approximately 180 beats/min. The 3D shape measurement technique discussed requires the capture of a sequence of fringe patterns to reconstruct one 3D frame. The fundamental assumption during acquisition is that the heart surface is static during the projection and acquisition of the fringe patterns. Yet, for a beating heart, the surface is constantly deforming. Therefore, in order to properly capture such a dynamically deforming object, the sampling rate must be high enough such that the motion-induced artifacts can be negligible. To determine the minimum frame rate to properly capture the heart surface without obvious motion artifacts, we measured the heart at frame rates of 200, 300, 400, 500, 800 and 1000 Hz. FIGS. 18A to 18F show the 3D reconstructed results with these speeds when the heart surface displays greatest deformation. FIGS. 18A and 18B show the results with large bumpy striping artifacts, which were induced by motion. As a comparison, when the capturing speed increases to above 800 Hz, the results, such as those shown in FIGS. 18E to 18F, become rather smooth. Based on these results, we determine that in order to properly capture a beating rabbit heart with an ex vivo intrinsic rate of 180 beats/min, the minimum capturing speed required is approximately 800 Hz when a two-frequency phase-shifting technique is adopted.

It important to note that we were not aware of any "better" technology that could measure the dynamic geometric surface motion of the beating rabbit heart, and thus there was no quantitative measure for these comparisons besides qualitative measure.

4. Conclusions

We present a two-wavelength phase-shifting-based system to measure rabbit hearts. Our system requires binary structured patterns and can achieve up to 4,000 Hz 3D shape measurement speed. Due to the low contrast of cardiac tissue, the projector and the camera must remain focused. An OPWM technique was used to generate high-frequency fringe patterns, and a dithering technique was employed to generate low frequency fringe patterns. Two-frequency phase-shifting was utilized in this system to achieve highest possible absolute 3D shape measurement speed. Our experiments found that for a formalin-fixed rabbit heart, the projection wavelength does not substantially influence the measurement quality; but for a beating rabbit heart, the projection wavelength drastically alters the measurement quality with blue light generating the best results. Furthermore, we observed the motion induced artifacts for a beating rabbit heart are minimized at a minimum capture speed of 800 Hz when a two frequency phase-shifting technique is adopted.

D. Options, Variations, and Alternatives

Although various embodiments of systems and methodologies have been described, it is to be understood that the present invention contemplates numerous other options, variations, and alternatives and the present invention is not to be limited to the specific embodiments described.

REFERENCES

The following references have been cited throughout the Specification. Each of these references is hereby incorporated by reference in its entirety.
1. S. Lei and S. Zhang, "Flexible 3-D shape measurement using projector defocusing," Opt. Lett. 34 (20), 3080-3082 (2009).
2. Y. Wang and S. Zhang, "Optimum pulse width modulation for sinusoidal fringe generation with projector defocusing," Opt. Lett. 35 (24), 4121-4123 (2010).
3. G. A. Ajubi, J. A. Ayubi, J. M. D. Martino, and J. A. Ferrari, "Pulse-width modulation in defocused three-dimensional fringe projection," Opt. Lett. 35 (21), 3682-3684 (2010).
4. Y. Wang and S. Zhang, "Comparison among square binary, sinusoidal pulse width modulation, and optimal pulse width modulation methods for three-dimensional shape measurement," Appl. Opt. 51 (7), 861-872 (2012).
5. T. Xian and X. Su, "Area Modulation Grating for Sinusoidal Structure Illumination on Phase-Measuring Profilometry," Appl. Opt. 40 (8), 1201-1206 (2001).
6. W. Lohry and S. Zhang, "3D shape measurement with 2D area modulated binary patterns," Opt. Laser Eng. 50 (7), 917-921 (2012).
7. T. L. Schuchman, "Dither signals and their effect on quantization noise," IEEE Trans. Comm. Techn. 12 (4), 162-165 (1964).
8. B. Bayer, "An optimum method for two-level rendition of continuous-tone pictures," IEEE International Conference on Communications 1, 11-15 (1973).
9. S. Lei and S. Zhang, "Digital sinusoidal fringe generation: defocusing binary patterns VS focusing sinusoidal patterns," Opt. Laser Eng. 48 (5), 561-569 (2010).
10. Y. Gong and S. Zhang, "Ultrafast 3-D shape measurement with an off-the-shelf DLP projector," Opt. Express 18 (19), 19,743-19,754 (2010).
11. S. Zhang, D. van der Weide, and J. Olvier, "Superfast phase-shifting method for 3-D shape measurement," Opt. Express 18 (9), 9684-9689 (2010).
12. W. Purgathofer, R. Tobler, and M. Geiler, "Forced random dithering: improved threshold matrices for ordered dithering," IEEE Intl Conf. Image Proc. 2, 1032-1035 (1994).
13. T. D. Kite, B. L. Evans, and A. C. Bovik, "Modeling and quality assessment of Halftoning by error diffusion," IEEE Intl Conf. Image Proc. 9 (5), 909-922 (2000).
14. Y. Xu, L. Ekstrand, J. Dai, and S. Zhang, "Phase error compensation for three-dimensional shape measurement with projector defocusing," Appl. Opt. 50 (17), 2572-2581 (2011).
15. P. S. Huang, C. Zhang, and F.-P. Chiang, "High-speed 3-D shape measurement based on digital fringe projection," Opt. Eng. 42 (1), 163-168 (2002).
16. S. Zhang, "Recent progresses on real-time 3-D shape measurement using digital fringe projection techniques," Opt. Laser Eng. 48 (2), 149-158 (2010).
17. Y. Wang and S. Zhang, "Three-dimensional shape measurement with binary dithered patterns," Appl. Opt. 51 (27), 6631-6636 (2012).
18. R. W. Floyd, "An adaptive algorithm for spatial gray scale," Proc Soc Inf Disp. 17 (1976).
19. W. M. Spears, "Crossover or Mutation," Foundations Genetic Alg., 221-237 (1992).
20. S. Zhang, "Flexible 3-D shape measurement using projector defocusing: Extended measurement range," Opt. Lett. 35 (7), 931-933 (2010).
21. D. Whitley, "The GENITOR Algorithm and Selection Pressure," Proc. of Int'l Conf. Genetic Alg., 116-121 (1989).
22. J. Laughner, S. Zhang, H. Li, and I. R. Efimov, "Mapping cardiac surface mechanics with structured light imaging," American Journal of Physiology—Heart and Circulatory Physiology 303 (6), H712-H720 (2002).
23. D. Malacara, ed., *Optical Shop Testing,* 3rd ed. (John Wiley and Sons, New York, 2007).
24. P. Stucki, "MECCAa multiple-error correcting computation algorithm for bilevel hardcopy reproduction," Tech. rep., IBM Res. Lab., Zurich, Switzerland (1981).
25. W. J. Bowen, "The absorption spectra and extinction coefficients of myoglobin," J. Biol. Chem. 179, 235-245 (1949).

What is claimed is:

1. A method for three-dimensional (3D) shape measurement comprising:
generating fringe patterns using a dithering technique;
projecting the fringe patterns onto an object using a projector;
capturing the fringe patterns distorted by surface geometry of the object using an imaging device; and
performing a fringe analysis to reconstruct a 3D shape of the object using the fringe patterns and the fringe patterns distorted by the surface geometry of the object.

2. The method of claim 1 wherein the step of generating the fringe patterns using the dithering technique comprises binarizing sinuisoidal fringe patterns with the dithering technique.

3. The method of claim 1 wherein the step of generating the fringe patterns using the dithering technique comprises applying an optimization algorithm.

4. The method of claim 1 wherein the fringe patterns approximate sinusoidal structures.

5. The method of claim 1 further comprising adjusting focus of the projector before projecting the fringe patterns.

6. The method of claim 1 further comprising generating an additional set of fringe patterns using a pulse width modulation technique.

7. The method of claim 6 further comprising projecting the additional set of the fringe patterns onto the object using the projector.

8. The method of claim 7 further comprising capturing the additional set of the fringe patterns distorted by the surface geometry of the object using the imaging device.

9. The method of claim 8 wherein the fringe analysis to reconstruct the 3D shape of the object further uses the additional set of the fringe patterns and the additional set of the fringe patterns as distorted by the surface geometry of the object.

10. The method of claim 9 wherein the pulse width modulation technique is an optimal pulse width modulation (OPWM) technique.

11. The method of claim 10 wherein the fringe patterns consist of low-frequency fringe patterns and the additional set of the fringe patterns consists of high-frequency fringe patterns.

12. The method of claim 1 wherein the imaging device is a camera.

13. A method for three-dimensional (3D) shape measurement comprising:
generating a first set of fringe patterns using a dithering technique;
generating a second set of fringe patterns using a pulse width modulation technique;

projecting the fringe patterns from the first set of the fringe patterns and the second set of the fringe patterns onto an object using a projector;

capturing the fringe patterns distorted by surface geometry of the object using an imaging device; and performing a fringe analysis to reconstruct a 3D shape of the object using the fringe patterns and the fringe patterns distorted by the surface geometry of the object using a computing device.

14. The method of claim 13 wherein the fringe patterns in the second set of the fringe patterns have higher frequencies than the fringe patterns in the first set of the fringe patterns.

15. The method of claim 14 wherein the first set of the fringe patterns consists of three fringe patterns and wherein the second set of the fringe patterns consists of three fringe patterns.

16. The method of claim 15 wherein the fringe analysis provides for determining an absolute phase change.

\* \* \* \* \*